(12) United States Patent
Bernstein et al.

(10) Patent No.: US 8,586,871 B2
(45) Date of Patent: Nov. 19, 2013

(54) INTERCONNECT SCHEMES, AND MATERIALS AND METHODS FOR PRODUCING THE SAME

(75) Inventors: Jonathan J. Bernstein, Medfield, MA (US); Brian R. Smith, Cambridge, MA (US); Thomas E. Boydston, Malden, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 191 days.

(21) Appl. No.: 13/185,866

(22) Filed: Jul. 19, 2011

(65) Prior Publication Data

US 2013/0021758 A1    Jan. 24, 2013

(51) Int. Cl.
*H05K 1/09*    (2006.01)
(52) U.S. Cl.
USPC ............... 174/257; 174/250; 174/260
(58) Field of Classification Search
USPC ............ 174/250, 257, 260; 361/728, 762
See application file for complete search history.

(56) References Cited

U.S. PATENT DOCUMENTS

| | | |
|---|---|---|
| 3,466,775 A | 9/1969 | Smith |
| 3,947,978 A | 4/1976 | Clark et al. |
| 6,053,405 A | 4/2000 | Irwin, Jr. et al. |
| 6,435,408 B1 | 8/2002 | Irwin, Jr. et al. |
| 6,491,215 B1 | 12/2002 | Irwin, Jr. et al. |
| 6,776,337 B2 | 8/2004 | Irwin, Jr. et al. |
| 6,987,453 B1 * | 1/2006 | Altwasser ............... 340/572.1 |
| 7,133,124 B2 | 11/2006 | Puttkammer |
| 7,148,128 B2 | 12/2006 | Jacobson |
| 7,331,725 B2 | 2/2008 | Troyansky et al. |
| 7,360,712 B2 | 4/2008 | Trantoul et al. |
| 7,640,658 B1 | 1/2010 | Pham et al. |
| 7,668,487 B2 * | 2/2010 | Sharma et al. ............. 399/237 |
| 2004/0160465 A1 | 8/2004 | Baker-Smith et al. |
| 2006/0086534 A1 * | 4/2006 | Oggioni et al. ............ 174/261 |
| 2008/0102257 A1 | 5/2008 | Aho et al. |
| 2009/0219136 A1 | 9/2009 | Brunet et al. |
| 2010/0123469 A1 | 5/2010 | Hyatt |

FOREIGN PATENT DOCUMENTS

EP    1383364 A2 *  1/2004    ............ H05K 3/12

OTHER PUBLICATIONS

Luca Quaroni and George Chumanov, "Preparation of Polymer-Coated Functionalized Silver Nanoparticles", J. Am. Chem. Soc. 1999, 121, 10642-10643.
Luca Quaroni and George Chumanov, "Preparation of Polymer-Coated Functionalized Silver Nanoparticles", J. Am. Chem. Soc. 1999, S1-S4.
M. Brust, M. Walker, D. Bethell, D. J. Schiffrin and R. Whyman, "Synthesis of Thiol-derivatised Gold Nanoparticles in a Two-phase Liquid-Liquid System", J. Chem. Soc., Chem. Commun., 1994 pp. 801-802.
J.F. Li et al., "Shell-isolated nanoparticle-enhanced Raman spectroscopy", Nature letters vol. 464, Mar. 18, 2010.
Y. Lu et al., "Synthesis and Self-Assembly of Au@SiO2 Core-Shell Colloids", Nano Letters 2002, vol. 2, No. 7, pp. 785-788.
L.M. Liz-Marzan et al., "Synthesis of Nanosized Gold-Silica Core-Shell Particles", Langmuir 1996, 12, pp. 4329-4335.

* cited by examiner

*Primary Examiner* — Hao C Nguyen
*Assistant Examiner* — Paresh Paghadal
(74) *Attorney, Agent, or Firm* — Goodwin Procter LLP (57) ABSTRACT

An interconnect scheme includes a conductive ink forming a plurality of conductive regions, and a dielectric ink occupying spaces between the conductive regions. The conductive ink and the dielectric ink have substantially identical optical, acoustic, and x-ray absorption properties, thereby making the interconnect scheme tamper-resistant and/or difficult to identify and reverse-engineer using conventional detection methods.

15 Claims, 5 Drawing Sheets

INTERCONNECT SCHEMES, AND MATERIALS AND METHODS FOR PRODUCING THE SAME

TECHNICAL FIELD

In various embodiments, the present invention relates to interconnect schemes, and to materials and methods for producing interconnect schemes that are tamper-resistant and/or difficult to identify and reverse-engineer.

BACKGROUND

Conductive traces or paths within an interconnect scheme, such as a circuit board or a multi-chip module, may be formed with an ink having conductive particles dispersed within a carrier fluid or binder. Although the carrier fluid may be non-conductive, electrical current is able to flow through the ink due to physical contact between the particles, which form a network of conductive paths through the ink.

Because interconnect schemes may be difficult and/or expensive to design and produce, and may contain sensitive information (e.g., proprietary information), owners and developers of interconnect schemes may wish to keep the schemes secret, prevent reverse engineering, and/or prevent tampering. Available techniques for protecting interconnect schemes include: detecting tamper or intrusion and taking countermeasures; adding dummy chips and extraneous conductive traces; applying obscuring or masking layers (e.g., to block or scatter light, x-rays, or sounds); implementing deciphering keys that are destroyed upon tampering; and employing a Physically Unclonable Function (PUF). Unfortunately, these techniques are not always effective. For example, obscuring or masking layers may be removed by sectioning or grinding. In addition, none of the other techniques identified above prevent an interconnect scheme from being identified using conventional methods, such as optical inspection, acoustic inspection, and x-ray inspection.

Accordingly, there is a need for materials and methods for producing interconnect schemes that are tamper-resistant and difficult to identify and reverse engineer. In particular, methods and materials are sought for producing interconnect schemes that cannot be identified using conventional detection methods.

SUMMARY OF THE INVENTION

In various embodiments, the present invention features an electrically conductive ink and a dielectric ink that have substantially identical optical, acoustic, and various electromagnetic properties (e.g., x-ray absorption and x-ray scatter). In one embodiment, conductive regions within an interconnect scheme are formed with the conductive ink, and spaces between the conductive regions are filled in with the dielectric ink. The resulting interconnect scheme is difficult to detect by optical inspection, acoustic inspection, and/or x-ray inspection.

From a commercial perspective, various embodiments of the materials and methods described herein may be employed in any situation where a developer or owner of an interconnect scheme desires to keep the scheme secret or prevent tampering. Particular applications include interconnect schemes for the military, classified electronics, and tamper-resistant electronics, such as cable or set-top boxes.

In general, in one aspect, embodiments of the invention feature an interconnect scheme (e.g., a printed circuit board or a multi-chip module). The interconnect scheme includes a conductive ink forming a plurality of conductive regions, and a dielectric ink occupying spaces between the conductive regions. The conductive ink and the dielectric ink have substantially identical optical, acoustic, and x-ray absorption properties.

In certain embodiments, each of the conductive ink and the dielectric ink includes at least one particle having an electrically conductive material, such as gold, silver, aluminum, nickel, copper, brass, platinum, palladium, graphite, and/or graphene. In another embodiment, the dielectric ink includes at least one particle having an electrically conductive core that is coated with a dielectric layer. The dielectric material may include an oxide coating, a self-assembling monolayer, a thiol-based chemical, and/or a polymer. The interconnect scheme may include at least one of a capacitor, an antenna, or a protective mesh.

In general, in another aspect, embodiments of the invention feature a method of producing an interconnect scheme (e.g., a printed circuit board or a multi-chip module). The method includes the steps of forming a plurality of conductive regions using a conductive ink, and filling in spaces between the conductive regions with a dielectric ink. The conductive ink and the dielectric ink have substantially identical optical, acoustic, and x-ray absorption properties.

In certain embodiments, each of the conductive ink and the dielectric ink includes at least one particle having an electrically conductive material, such as gold, silver, aluminum, nickel, copper, brass, platinum, palladium, graphite, and/or graphene. In another embodiment, the dielectric ink includes at least one particle having an electrically conductive core that is coated with a dielectric layer, such as an oxide coating, a self-assembling monolayer, a thiol-based chemical, and/or a polymer.

In general, in yet another aspect, embodiments of the invention feature a crossbar matrix. The crossbar matrix includes (i) a plurality of conductive paths, (ii) a first via, including a conductive ink, connecting a first two of the conductive paths, and (iii) a second via, including a dielectric ink, connecting a second two of the conductive paths. The conductive ink and the dielectric ink have substantially identical optical, acoustic, and x-ray absorption properties.

In general, in still another aspect, embodiments of the invention feature a dielectric material. The material includes a dielectric resin, and a plurality of particles dispersed within the dielectric resin. Each particle includes an electrically conductive core, and a dielectric coating disposed upon the electrically conductive core. The dielectric coatings prevent electrical current from being conducted between the plurality of particles.

In certain embodiments, the dielectric coating includes an oxide coating, a self-assembling monolayer, a thiol-based chemical, and/or a polymer. The electrically conductive core may include gold, silver, aluminum, nickel, copper, brass, platinum, palladium, graphite, and/or graphene.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means within ±10%, in certain embodiments within ±5%, in some embodiments within ±2%, and in further embodiments within ±1%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DESCRIPTION

As used herein, the term "interconnect scheme" generally refers to an arrangement of one or more conductive paths or traces. An interconnect scheme may be, for example, a circuit board, an electronic module, a hybrid circuit, a multi-chip module, a chip, and/or a die. For its part, as used herein, the term "ink" includes any material, such as a paste, a paint, a powder, and/or a dispersion, that may be used to form a trace or path between two locations.

Various embodiments of the present invention provide methods and materials for producing an interconnect scheme that is difficult to detect or reverse engineer using conventional techniques. The materials include a conductive ink and a dielectric ink that have identical or substantially identical optical, acoustic, and electromagnetic properties. In one embodiment, the interconnect scheme is produced by forming conductive regions (e.g., traces) with the conductive ink, and filling in the spaces between the conductive regions with the dielectric ink. The resulting interconnect scheme is difficult to detect by optical inspection, acoustic inspection, and/or x-ray inspection, as the results from these inspection methods show a uniform, low contrast layer.

Figure 1:
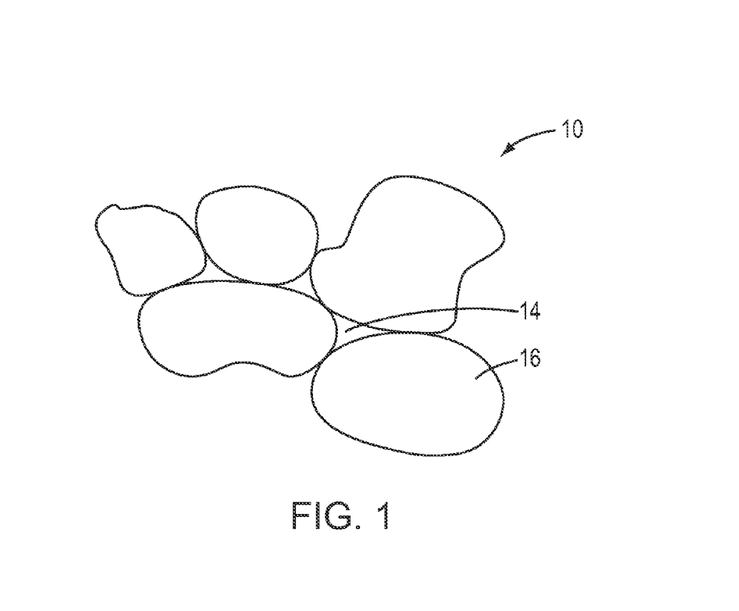
FIG. 1 is a schematic view of particles suspended within a conductive ink, in accordance with one embodiment of the invention.
Figure 2:
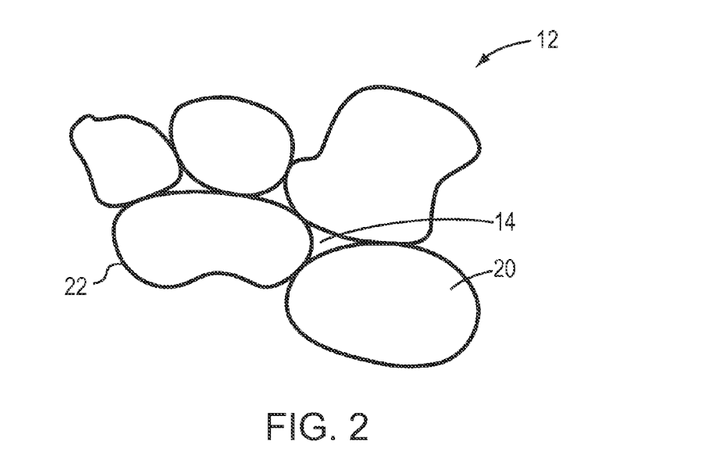
FIG. 2 is a schematic view of particles suspended within a dielectric ink, in accordance with one embodiment of the invention.

Referring to FIGS. 1 and 2, in certain embodiments, a conductive ink 10 and a dielectric ink 12 include particles suspended within a dielectric carrier fluid (matrix) 14. As depicted in FIG. 1, the conductive ink 10 includes a dispersion of electrically conductive particles 16. Although the carrier matrix 14 may be non-conductive, electrical current is free to flow through the conductive ink 10 via the conductive particles 16, which are in physical contact with one another and provide a network of conductive pathways. By contrast, as depicted in FIG. 2, the dielectric ink 12 includes particles having conductive cores 20 and dielectric coatings 22. The dielectric coatings 22 prevent electrical current from flowing through the dielectric ink 12 by, for example, electrically insulating the conductive cores 20 and/or preventing physical contact between the conductive cores 20.

The conductive cores 20 and the conductive particles 16 may be made of the same material, may have similar shapes and sizes, and/or may be present in their respective inks 10, 12 in similar particle volume fractions (i.e., the fraction of a volume of ink that is occupied by the particles). For example, the conductive particles 16 and the conductive cores 20 may both be made of any conductive material, such as graphite, graphene, carbon fiber, one or more conductive polymers, and/or one or more metals, including gold, silver, aluminum, nickel, copper, brass, platinum, and/or palladium. Each conductive particle 16 and conductive core 20 may have a cross-dimension or diameter between about 0.01 microns and about 10 microns. Particle volume fractions for the two inks 10, 12 may be between about 5% and about 90%.

The conductive particles 16 and conductive cores 20 can have any shape. For example, they can be shaped like a fiber or a filament, or shaped like a sheet, a plate, or a disk.

The carrier matrix (fluid) 14 for the two inks 10, 12 may be any non-conductive liquid plus binders. For example, the carrier fluid 14 may include a polymer, a dissolved polymer, or a liquid polymer dispersed in a solvent, such as an organic or inorganic liquid mixture, which is driven off during a bake operation.

For its part, the dielectric coating 22 within the dielectric ink 12 may include any sufficiently non-conductive material, such as a thiol-based molecule, a polymer, and/or an oxide. A thickness of the dielectric coating 22 may be chosen so as to provide a desired electrical resistance. In certain embodiments, the thickness of the dielectric coating 22 is about 1 nm, about 10 nm, or about 100 nm.

In certain embodiments, the dielectric coating 22 includes a thiol-based molecule. Thiol-based molecules typically bind strongly to gold and silver surfaces. For example, self assembling monolayers (SAMs) may be formed by exposing gold or silver surfaces to chemicals containing a thiol (sulfur) group. In general, the thiol-based molecule may be any thiol-based molecule that binds to the conductive core 20 and provides a dielectric coating. In certain applications, such as fiber based composites, the self assembling layer is known as a coupling agent, used to increase the strength of adhesion between the fiber and the polymer matrix. The coupling agent may be, for example, 2-(2-pyridylethyl)thiopropyl-trimethoxysilane (i.e., $C_{13}H_{23}NO_3SSi$, which contains both sulfur and silane groups), available from Gelest, Inc. (in catalog number SIP6926.2), of Morrisville, Pa. In other embodiments, the thiol-based molecule is dodecane thiol, available from Sigma Aldrich, Co., of St. Louis, Mo., octadecane thiol, available from Alfa Aesar, Inc., of Ward Hill, Mass., and/or hexadecane thiol (HDTh), also available from Alfa Aesar.

In other embodiments, the dielectric coating 22 includes any non-conductive polymer or combination of non-conductive polymers capable of coating and adhering to a conductive core 20, such as polystyrene, poly(methyl methacrylate), polycarbonate, polyethylene, polyurethane, nylon, and/or polyvinyl chloride. In one embodiment, styrene and/or methacrylic acid are polymerized on the surfaces of the conductive cores 20 (e.g., silver nanoparticles) in emulsions of oleic acid. A thickness of the polymer coating may be adjusted by changing a concentration of one or more monomers.

In yet another embodiment, the dielectric coating 22 is an oxide coating, which may be obtained or applied before the conductive cores 20 are mixed into the paste or ink 12. For example, powdered aluminum particles may be oxidized in the presence of oxygen and water or steam. A thin aluminum oxide layer may be a good insulator. For example, a 1 nm aluminum oxide coating may withstand about 1 V of potential, and a conductive path formed from a series of many oxidized particles may be able to withstand much higher voltages. In certain embodiments, a precisely controlled coating of $SiO_2$ may be produced on gold or silver particles, using procedures that are well known in the art.

By choosing the same materials, shapes, and/or sizes for the conductive particles 16 and the conductive cores 20 and/or by including them in their respective inks 10, 12 in similar particle volume fractions, the conductive ink 10 and the dielectric ink 12 have identical or substantially identical x-ray, optical, and acoustic properties. That is, as described herein, the dielectric coating 22 material, its thickness, etc. are chosen so as to render the dielectric ink 12 non-conductive, but not so as to substantially alter the x-ray, optical, or acoustic properties of the dielectric ink 12. As a result, as described above, the dielectric ink 12 and the conductive ink 10 may be used to form an interconnect scheme that is tamper-resistant and/or difficult to detect or reverse engineer. For example, the inks 10, 12 and methods described herein advantageously make conductive layers or traces difficult to visualize even when they are sectioned or x-rayed.

In certain embodiments, the conductive ink 10 and the dielectric ink 12 are substantially indistinguishable using x-ray detection methods. Heavy metals, such as gold and silver, absorb and scatter x-rays far more than lighter elements, such as carbon, aluminum, or silicon. Hence, the x-ray properties of the two inks 10, 12 may be dominated by the presence of metallic particles. A very thin (e.g., between about 1 nm and about 100 nm) coating 22 of polymer or thiol-based molecules around each conductive core 20 may therefore be invisible or substantially invisible to x-ray detection, such as micro-CT analysis.

In addition, in various embodiments, the conductive ink 10 and the dielectric ink 12 are substantially indistinguishable using acoustic detection methods. For example, acoustic microscopy is often used to analyze materials in transmission or reflection based on their acoustic impedance. Typically, a pulse of acoustic energy (centered near a resonant frequency of a transducer) is applied to the device under test (DUT), and discontinuities in acoustic impedance are detected due to reflections. The time delay until a reflection is received is related to the depth within the DUT. By scanning the acoustic transducer over the DUT, and time-gating the acoustic reflection signal, a thin section of the device can be imaged. The acoustic impedance (i.e., the product of density and the speed-of-sound) of the dielectric ink 12 is virtually unchanged by a thin polymer layer 22 surrounding each conductive core 20. As a result, an interconnect scheme produced with the conductive ink 10 and dielectric ink 12 may be invisible to acoustic detection, such as acoustic microscopy.

The conductive ink 10 and the dielectric ink 12 may also be substantially indistinguishable using optical detection methods. In general, the optical properties of the conductive ink 10 and the dielectric ink 12 depend on the sizes, shapes, and relative positions of the particles, as well as the index of refraction of the carrier fluid 14. A very thin insulating layer 22 (i.e., in the range 1-100 nm) on the conductive cores 20 is invisible or substantially invisible. As a result, the optical properties of the dielectric ink 12 may be uninfluenced by the presence of the dielectric coating 22 on the conductive cores 20. Furthermore, if the dielectric coating 22 has the same index of refraction as the carrier matrix 14, then the dielectric coating 22 may be effectively invisible, and the conductive ink 10 and the dielectric ink 12 may be indistinguishable by optical inspection. In one embodiment, the dielectric coating 22 and the carrier fluid 14 are chosen to have identical or nearly identical refractive indices. For example, the refractive indices of the dielectric coating 22 and the carrier matrix 14 may differ by less than 20%, 10%, 5%, or 2%.

The conductive ink 10 and the dielectric ink 12 generally also have substantially identical high frequency electromagnetic properties. As a result, interconnect schemes formed with the conductive ink 10 and the dielectric ink 12, as described above, may be indistinguishable using detection methods that employ infrared light, visible light, ultraviolet light, x-rays, and/or gamma rays.

In one embodiment, the dielectric coating 22 on the conductive cores 20 is self-healing. For example, when an excess of a thiol compound is present within the dielectric ink 12, the compound can re-form an SAM layer if the original layer 22 is disrupted or damaged. The coating 22 may be damaged, for example, during extrusion or screen printing of the dielectric ink 12 due to abrasion between the particles or adjacent surfaces. By reforming the damaged coating 22, however, the insulating properties of the dielectric ink 12 are generally maintained. Once the ink 12 has been positioned within the interconnect scheme, any excess coating material (e.g., thiol compound) may be removed by baking or vacuum baking.

In one embodiment, the dielectric coating 22 material is an SAM chemical having a low vapor pressure. The vapor pressure at 20° C. may be, for example, less than about 100 Pa, less than about 10 Pa, or less than about 1 Pa. The low vapor pressure allows excess SAM chemical to remain in the conductor or interconnect scheme after baking so that self-healing may occur, as needed. In another embodiment, the SAM chemical has a higher vapor pressure at the temperature of baking, such as greater than about 100 Pa, greater than about 1000 Pa, or greater than about 10,000 Pa. In this embodiment, the higher vapor pressure allows excess SAM chemical to be completely or almost completely removed by baking.

Figure 3:
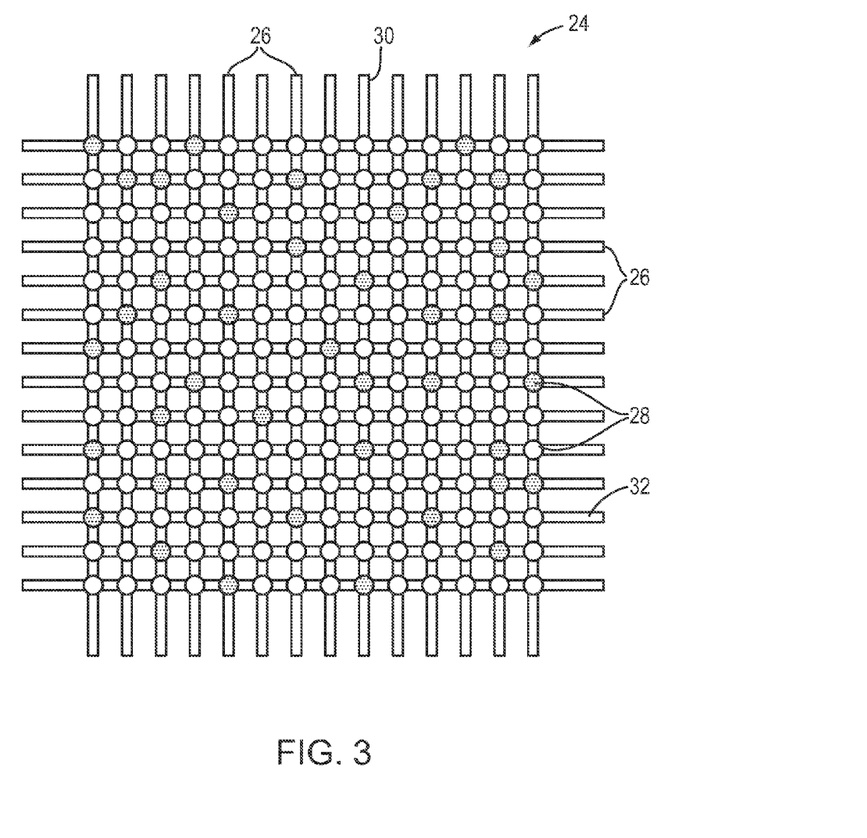
FIG. 3 is a schematic diagram of a crossbar array having conductive and non-conductive grid connections, in accordance with one embodiment of the invention.

In one embodiment, the conductive ink 10 and the dielectric ink 12 are used to form a crossbar data storage device or chip. FIG. 3 depicts an exemplary crossbar array 24 in which regular grids of conductive paths 26 are applied on different layers and connected through vias 28. Specifically, a first layer 30 includes a series of parallel conductive paths 26 aligned in a first direction, and a second layer 32 includes a series of parallel conductive paths 26 aligned in a second direction that is perpendicular to the first direction. At each location where the conductive paths 26 overlap, the vias 28 may be filled with a conductive or insulating material, such as the conductive ink 10 or the dielectric ink 12. When a via 28 is filled with the conductive ink 10, the conductive paths 26 that overlap at the via 28 are electrically connected. By contrast, when a via 28 is filled with the dielectric ink 12, the conductive paths 26 that overlap at the via 28 are not electrically connected. In certain embodiments, the crossbar array 24 is used to store information.

In one embodiment, a crossbar data storage chip, such as the crossbar array 24, is given a unique identifier. The identifier may be modified during a write pattern using, for example, an ink jet printer or a drop on demand ejector with X-Y position control. An ability to customize each chip with the conductive ink 10 and the dielectric ink 12 may make it difficult to detect or reverse engineer the interconnect scheme within the chip. In addition, having reverse engineered one module, other customizable modules with a different pattern of conductive vias remain un-compromised. A programmable ink jet printer or other programmable dispenser of conductive inks or pastes may provide the desired level of chip customization.

Figure 4:
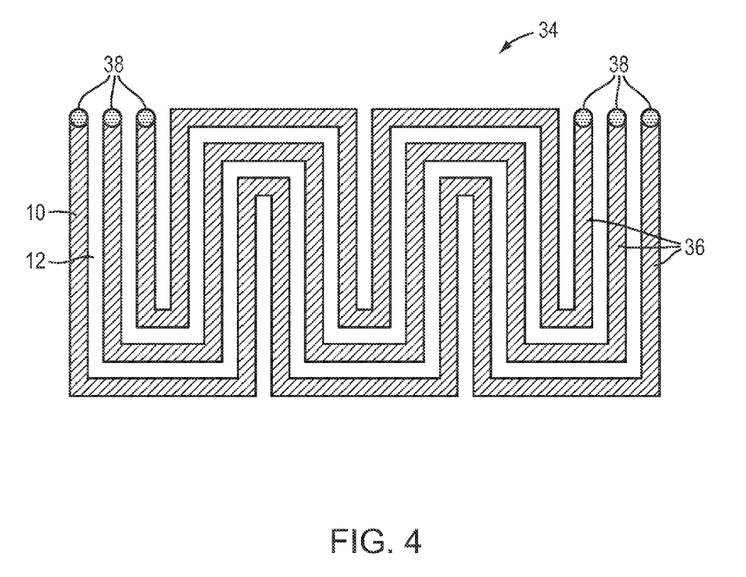
FIG. 4 is a schematic diagram of a serpentine protective mesh, in accordance with one embodiment of the invention.
Figure 5:
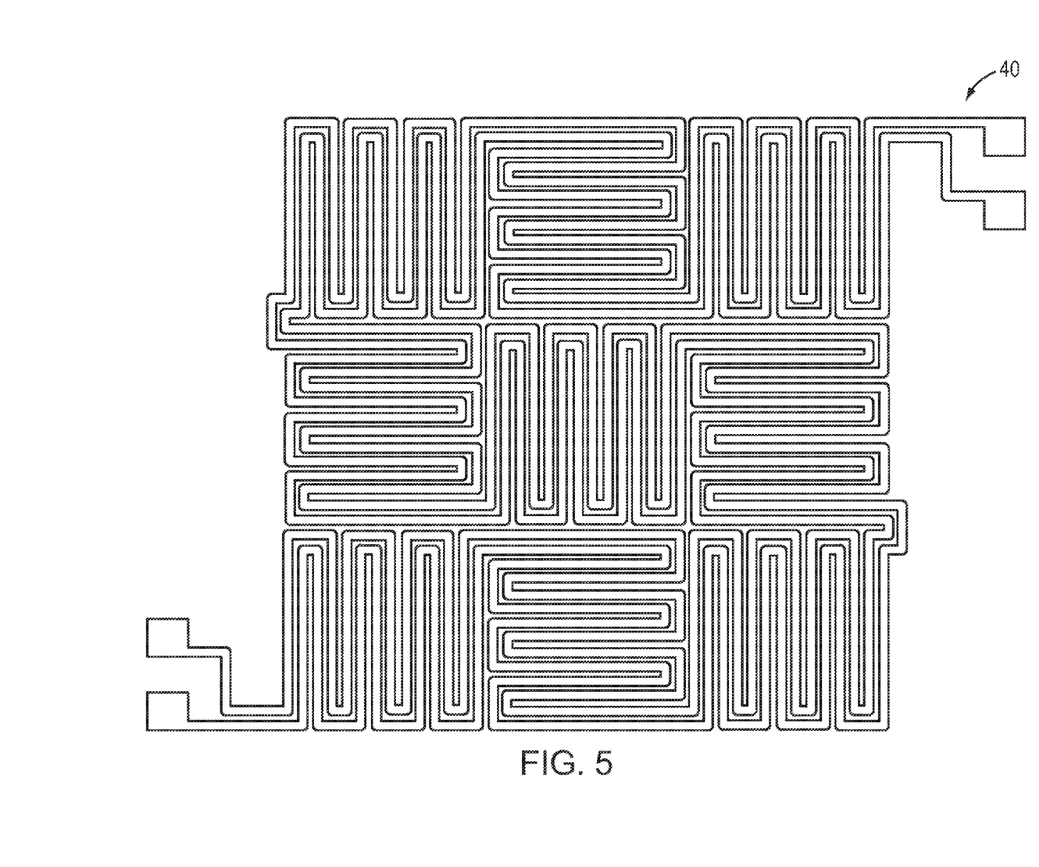
FIG. 5 depicts a screen-printed protective mesh, in accordance with one embodiment of the invention.

Referring to FIG. 4, in another embodiment, the conductive ink 10 and the dielectric ink 12 are used to produce a serpentine protective mesh 34 for protecting a circuit or electronic module. As depicted, the protective mesh 34 may include serpentine conductive traces 36 that almost completely fill in one or more planes in the circuit or module. The conductive traces 36 may be formed with the conductive ink 10, and the spaces between the conductive traces 36 may be filled in with the dielectric ink 12. Ends of the conductive traces 36 may include vias or electrical contacts 38 for connection with other components. Although only three conductive traces 36 are illustrated in FIG. 4, the protective mesh 34 may in fact feature fewer or more conductive traces 36 (e.g., two, four, etc.). For example, FIG. 5 depicts a screen-printed protective mesh 40 having two conductive traces, in accordance with one embodiment of the invention.

In one embodiment, the protective mesh 34 is used to prevent tampering. For example, attempts to penetrate or cut through the protective mesh 34 may trigger a circuit that destroys keys or takes other action to disable the module. In addition, by using the conductive ink 10 and the dielectric ink 12, the conductive traces 36 within the protective mesh 34 may be more difficult to detect, thereby making the protective mesh 34 more difficult to defeat.

In certain embodiments, the conductive ink 10 and the dielectric ink 12 are used to form a capacitor. For example, two conductive regions may be formed with the conductive ink 10, and the spaces between the conductive regions may be filled with the dielectric ink 12.

In yet another embodiment, the conductive ink 10 and the dielectric ink 12 are used to form an antenna. For example, the antenna may include a conductive region surrounded by a dielectric region. The conductive region may be formed with the conductive ink 10, and the dielectric region may be formed with the dielectric ink 12. In one particular example, the conductive region is formed as a planar surface (e.g., as a square, a rectangle, a circle, etc.), thereby forming a radiating element of a planar antenna. The planar conductive region may then be disposed over a ground plane (e.g., a metal plate, etc.), or the ground plane can be another planar surface formed using the conductive ink 10. The space between the ground plane and the planar conductive region configured as the radiating element may be filled with the dielectric ink 12 so as to form a planar antenna.

As another example, the conductive traces 36 of the protective mesh 34, instead of being disposed in a serpentine configuration as shown in FIG. 4, may be disposed in a spiral configuration so as to mimic the spiral arms of a spiral antenna. As in the case of the protective mesh 34, the spaces between the conductive traces 36 may be filled in with the dielectric ink 12, thereby forming the spiral antenna.

Example

An experimental verification of the materials and methods described herein was carried out as discussed below. Specifically, samples of two commercially available conductive silver paints were obtained. These two paints were SPI Conductive Silver Paint and DOTITE® Silver Paint D-550, available from Structure Probe, Inc., of West Chester, Pa. These paints were squeegeed onto glass microscope slides and dried in an oven at 100° C. for 0.5 hours to obtain samples "SPI1" (from the SPI Conductive Silver Paint) and "D550-1" (from the DOTITE® Silver Paint D-550). Two additional slides were similarly prepared, and were then exposed to vapors from Hexadecane Thiol (HDTh) for 0.5 hours to obtain samples "SPI-2" (from the SPI Conductive Silver Paint) and "D550-2" (from the DOTITE® Silver Paint D-550). The electrical resistance of these films was measured. Samples SPI-2 and D550-2 were then re-exposed to HDTh vapors for an additional 27 hours, and electrical resistance was again measured. Each of the silver paints was then mixed with HDTh (2 grams silver paint, 0.1 gram HDTh) in small glass jars, and left for three days to react. The resulting paints were then squeegeed onto glass slides, air-dried for one hour, and oven-dried at 85° C. for 45 minutes to obtain sample glass slides "SPI-3" (from the SPI Conductive Silver Paint) and "D550-3" (from the DOTITE® Silver Paint D-550). All samples were measured by a four point probe and then by a two point probe, with the probe points separated by one cm.

Figure 6:
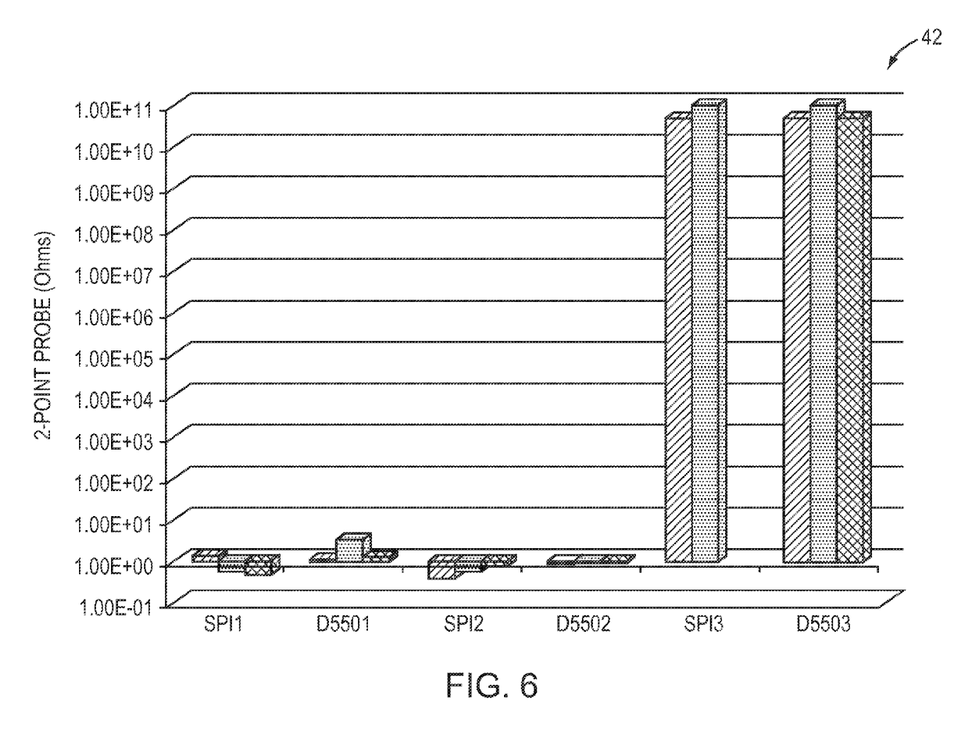
FIG. 6 is a graph of electrical resistance for various conductive inks and dielectric inks, in accordance with one embodiment of the invention.

Referring to the graph 42 in FIG. 6, the silver paint (i.e., samples SPI-1 and D550-1) showed low electrical resistance, as expected. Exposure of dried films to HDTh vapors (i.e., samples SPI-2 and D550-2) had little effect on the resistivity. However, premixing the silver paint and HDTh caused the final films (i.e., samples SPI-3 and D550-3) to become essentially insulating—the resistivity of these films increased by approximately a factor of $10^{10}$. Therefore, in certain embodiments, samples SPI-1 or D550-1 could be used as a conductive ink, and SPI-3 or D550-3, respectively, could be used as a dielectric ink. An interconnect scheme produced with these materials would be difficult to detect or to reverse engineer, as described above.

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An interconnect scheme, comprising:
a conductive ink forming a plurality of conductive regions, the conductive ink comprising at least one conductive particle having a first electrically conductive material; and
a dielectric ink occupying spaces between the conductive regions, the dielectric ink comprising at least one particle having a conductive core and a dielectric coating, the conductive core comprising a second electrically conductive material,
wherein the first and second electrically conductive materials are substantially identical and further wherein the conductive ink and the dielectric ink have substantially identical optical, acoustic, and x-ray absorption properties.

2. The interconnect scheme of claim 1, wherein the interconnect scheme is a printed circuit board.

3. The interconnect scheme of claim 1, wherein the interconnect scheme is a multi-chip module.

4. The interconnect scheme of claim 1, wherein the first and second electrically conductive materials are selected from the group consisting of gold, silver, aluminum, nickel, copper, brass, platinum, palladium, graphite, and graphene.

5. The interconnect scheme of claim 1, wherein the dielectric coating comprises a material selected from the group consisting of an oxide coating, a self-assembling monolayer, a thiol-based chemical, and a polymer.

6. The interconnect scheme of claim 1, wherein the interconnect scheme comprises at least one of a capacitor, an antenna, or a protective mesh.

7. The interconnect scheme of claim 1, wherein the at least one conductive particle and the conductive core are substantially similar in size.

8. The interconnect scheme of claim 1, wherein the at least one conductive particle and the conductive core are substantially similar in shape.

9. The interconnect scheme of claim 1, wherein the at least one conductive particle is present in the conductive ink in a particle volume fraction, and the conductive core is present in the dielectric ink in a substantially similar particle volume fraction.

10. A method of producing an interconnect scheme, comprising:
- forming a plurality of conductive regions using a conductive ink, the conductive ink comprising at least one conductive particle having a first electrically conductive material; and
- filling in spaces between the conductive regions with a dielectric ink, the dielectric ink comprising at least one particle having a conductive core and a dielectric coating, the conductive core comprising a second electrically conductive material,
- wherein the first and second electrically conductive materials are substantially identical and further wherein the conductive ink and the dielectric ink have substantially identical optical, acoustic, and x-ray absorption properties.

11. The method of claim 10, wherein the interconnect scheme produced is a printed circuit board.

12. The method of claim 10, wherein the interconnect scheme produced is a multi-chip module.

13. The method of claim 10, wherein the first and second electrically conductive materials are selected from the group consisting of gold, silver, aluminum, nickel, copper, brass, platinum, palladium, graphite, and graphene.

14. The method of claim 10, wherein the dielectric coating layer comprises a material selected from the group consisting of an oxide coating, a self-assembling monolayer, a thiol-based chemical, and a polymer.

15. A crossbar matrix, comprising:
- a plurality of conductive paths;
- a first via, comprising a conductive ink, connecting a first two of the conductive paths, the conductive ink comprising at least one conductive particle having a first electrically conductive material; and
- a second via, comprising a dielectric ink, connecting a second two of the conductive paths, the dielectric ink comprising at least one particle having a conductive core and a dielectric coating, the conductive core comprising a second electrically conductive material,
- wherein the first and second electrically conductive materials are substantially identical and further wherein the conductive ink and the dielectric ink have substantially identical optical, acoustic, and x-ray absorption properties.

* * * * *

UNITED STATES PATENT AND TRADEMARK OFFICE
CERTIFICATE OF CORRECTION

PATENT NO. : 8,586,871 B2
APPLICATION NO. : 13/185866
DATED : November 19, 2013
INVENTOR(S) : Jonathan J. Bernstein et al.

It is certified that error appears in the above-identified patent and that said Letters Patent is hereby corrected as shown below:

In the Claims:

In Claim 14, column 10, line 4, please delete "layer".

Signed and Sealed this
Eighteenth Day of February, 2014

Michelle K. Lee
*Deputy Director of the United States Patent and Trademark Office*